United States Patent [19]
DelDuca et al.

[11] Patent Number: 5,948,457
[45] Date of Patent: *Sep. 7, 1999

[54] MODIFIED ATMOSPHERE PACKAGE

[75] Inventors: Gary R. DelDuca, Canandaigua; Alan E. Deyo, Rushville; Vinod K. Luthra; Wen P. Wu, both of Pittsford, all of N.Y.

[73] Assignee: Tenneco Packaging Inc., Evanston, Ill.

[ * ] Notice: This patent is subject to a terminal disclaimer.

[21] Appl. No.: 09/094,008

[22] Filed: Jun. 9, 1998

Related U.S. Application Data

[63] Continuation of application No. 08/763,719, Dec. 13, 1996, Pat. No. 5,811,142, which is a continuation-in-part of application No. 08/627,137, Apr. 3, 1996, Pat. No. 5,698,250.

[51] Int. Cl.$^6$ ....................................................... A23B 4/00
[52] U.S. Cl. .......................... 426/124; 53/432; 206/557; 426/129; 426/133; 426/392; 426/396
[58] Field of Search .................................. 426/124, 129, 426/133, 392, 396, 397, 410, 418; 206/213.1, 557; 53/432–434, 510; 252/188.28

[56] References Cited

U.S. PATENT DOCUMENTS

| 1,475,396 | 11/1923 | Kestner. |
| 1,679,543 | 8/1928 | Rector .................................. 426/124 |
| 2,825,651 | 3/1958 | Loo et al. ................................. 99/171 |

(List continued on next page.)

FOREIGN PATENT DOCUMENTS

| 457457 | 4/1991 | European Pat. Off. . |
| 06278774 | 10/1994 | Japan . |
| 06343815 | 12/1994 | Japan . |
| 92/4298 | 6/1992 | South Africa . |

OTHER PUBLICATIONS

Brochure: :Fuji–Formost FW–3700 "High Speed Horizontal Form–Fill Seal Machine", 1992.
Brochure: Multiform Disiccants Inc., FreshPax Oxygen Absorbing Packets, 1994.
"Longer Product Shelf Life Using Modified Atmosphere Packaging," Nancy Muller, The National Provisioner, Feb. 1, 1986, pp. 19–23.
"Controlled and Modified Atmosphere Packaging," Fran Labell, Jan., 1985, Food Processing, pp. 152–154.
List of Oxygen Absorber References, pp. 1–32, Undated.
Leward, D.A., "Metmyoglobin Formation in Beef Stored in Carbon Dioxide Enriched and Oxygen Depleted Atmospheres," Journal of Food Science vol. 35 pp. 33–37 (1970).
Gill, C. O., et al., "The Use of Oxygen Scavengers to Prevent Transcient Discolouration of Ground Beef Packaged Under Controlled, Oxygen–depleted Atmospheres," Meat Science, vol. 41, No. 1, pp. 19–27, (1995).
Gill, C. O., "Extending the Storage Life of Raw Chilled Meats," Elsevier Science Ltd., S99–S109 (1990).

*Primary Examiner*—Joseph W. Drodge
*Attorney, Agent, or Firm*—Arnold White & Durkee

[57] ABSTRACT

A modified atmosphere packaging method creates a modified atmosphere in a package including an inner package and an outer package. The inner package is composed at least partially of a polymeric material substantially permeable to oxygen, while the outer package is composed of a polymeric material substantially impermeable to oxygen. After a food product such as raw meat is placed within the inner package, the inner package is flushed with a desired mixture of gases to substantially remove oxygen from the inner package. The flushed inner package is then sealed and inserted into the outer package without sealing the outer package. Next, the outer package is flushed with the desired mixture of gases to substantially remove oxygen from the outer package. After flushing the outer package, the outer package is sealed. An oxygen scavenger is provided in the package to substantially absorb any residual oxygen within the package. The oxygen scavenger is activated with an oxygen uptake accelerator to increase the rate at which the residual oxygen is absorbed.

17 Claims, 3 Drawing Sheets

U.S. PATENT DOCUMENTS

| | | | |
|---|---|---|---|
| 3,363,395 | 1/1968 | King | 53/112 |
| 3,419,400 | 12/1968 | Hayhurst et al. | 99/171 |
| 3,467,244 | 9/1969 | Mahaffy et al. | 206/45.34 |
| 3,481,100 | 12/1969 | Bergstrom | 53/22 |
| 3,545,163 | 12/1970 | Mahaffy et al. | 53/22 |
| 3,574,642 | 4/1971 | Weinke | 99/174 |
| 3,634,993 | 1/1972 | Pasco et al. | 53/22 A |
| 3,650,775 | 3/1972 | Simon et al. | 99/174 |
| 3,679,093 | 7/1972 | Chang | 220/90.2 |
| 3,686,822 | 8/1972 | Wolfelsperger | 53/22 A |
| 3,750,362 | 8/1973 | Kishpaugh et al. | 53/22 A |
| 3,788,369 | 1/1974 | Killinger | 141/114 |
| 3,792,181 | 2/1974 | Mahaffy et al. | 426/123 |
| 3,843,806 | 10/1974 | Kishpaugh et al. | 426/106 |
| 3,851,441 | 12/1974 | Marchand | 53/116 |
| 3,903,309 | 9/1975 | Mahaffy et al. | |
| 4,083,372 | 4/1978 | Boden | 131/8 |
| 4,127,503 | 11/1978 | Yoshikawa et al. | 252/439 |
| 4,141,487 | 2/1979 | Faust et al. | 229/43 |
| 4,166,807 | 9/1979 | Komatsu et al. | 252/439 |
| 4,192,773 | 3/1980 | Yoshikawa et al. | 252/429 |
| 4,201,030 | 5/1980 | Mahaffy et al. | 53/432 |
| 4,230,595 | 10/1980 | Yamaji et al. | 252/188 |
| 4,242,659 | 12/1980 | Baxter et al. | 338/28 |
| 4,299,719 | 11/1981 | Aoki et al. | 252/188 |
| 4,308,711 | 1/1982 | Mahaffy et al. | 53/511 |
| 4,317,742 | 3/1982 | Yamaji et al. | 252/188 |
| 4,337,276 | 6/1982 | Nakamura et al. | 426/124 |
| 4,340,138 | 7/1982 | Bernhardt | 206/216 |
| 4,349,999 | 9/1982 | Mahaffy et al. | 53/128 |
| 4,366,179 | 12/1982 | Nawata et al. | 426/395 |
| 4,384,972 | 5/1983 | Nakamura | 252/188.21 |
| 4,406,813 | 9/1983 | Fujishima et al. | 252/188.28 |
| 4,411,122 | 10/1983 | Cornish et al. | 53/436 |
| 4,411,918 | 10/1983 | Cimino et al. | 426/124 |
| 4,424,659 | 1/1984 | Perigo et al. | 53/425 |
| 4,454,945 | 6/1984 | Jabarin et al. | 206/524.3 |
| 4,510,162 | 4/1985 | Nezat | 426/124 |
| 4,517,206 | 5/1985 | Murphy et al. | 426/115 |
| 4,524,015 | 6/1985 | Takahashi et al. | 252/188.28 |
| 4,536,409 | 8/1985 | Farrell et al. | 426/398 |
| 4,543,770 | 10/1985 | Walter et al. | 53/511 |
| 4,564,054 | 1/1986 | Gustavsson | 141/329 |
| 4,574,174 | 3/1986 | McGonigle | 219/10.55 M |
| 4,579,223 | 4/1986 | Otsuka et al. | 206/204 |
| 4,581,764 | 4/1986 | Plock et al. | 383/101 |
| 4,588,561 | 5/1986 | Aswell et al. | 422/238 |
| 4,622,229 | 11/1986 | Toshitsugu | 426/395 |
| 4,622,239 | 11/1986 | Schoenthaler et al. | 427/96 |
| 4,645,073 | 2/1987 | Homan | 206/219 |
| 4,657,610 | 4/1987 | Komatsu et al. | 156/87 |
| 4,683,139 | 7/1987 | Cheng | 426/265 |
| 4,683,702 | 8/1987 | Vis | 53/433 |
| 4,685,274 | 8/1987 | Garwood | 53/433 |
| 4,711,741 | 12/1987 | Fujishima et al. | 252/188.28 |
| 4,737,389 | 4/1988 | Hartsing, Jr. et al. | 428/35 |
| 4,740,402 | 4/1988 | Maeda et al. | 428/35 |
| 4,756,436 | 7/1988 | Morita et al. | 215/228 |
| 4,762,722 | 8/1988 | Izumioto et al. | 426/124 |
| 4,769,175 | 9/1988 | Inoue | 252/188.28 |
| 4,820,442 | 4/1989 | Motoyma et al. | 252/188.28 |
| 4,830,855 | 5/1989 | Stewart | 424/448 |
| 4,830,863 | 5/1989 | Jones | 426/118 |
| 4,836,952 | 6/1989 | Nasu et al. | 252/188.28 |
| 4,840,271 | 6/1989 | Garwood | 206/213.1 |
| 4,842,875 | 6/1989 | Anderson | 426/118 |
| 4,876,146 | 10/1989 | Isaka et al. | 428/347 |
| 4,877,664 | 10/1989 | Maeda et al. | 428/35.9 |
| 4,897,274 | 1/1990 | Candida et al. | 426/127 |
| 4,908,151 | 3/1990 | Inoue et al. | 252/188.28 |
| 4,910,032 | 3/1990 | Antoon, Jr. | 426/118 |
| 4,923,703 | 5/1990 | Antoon, Jr. | 426/118 |
| 4,928,474 | 5/1990 | Schirmer | 53/425 |
| 4,942,048 | 7/1990 | Nasu et al. | 426/271 |
| 4,943,440 | 7/1990 | Armstrong | 426/118 |
| 4,949,847 | 8/1990 | Nagata | 206/484.1 |
| 4,952,451 | 8/1990 | Mueller | 428/218 |
| 4,956,209 | 9/1990 | Isaka et al. | 428/35.2 |
| 4,992,410 | 2/1991 | Cullen et al. | 502/407 |
| 4,996,068 | 2/1991 | Hatakeyama et al. | 426/234 |
| 5,019,212 | 5/1991 | Morita et al. | 162/157.3 |
| 5,021,515 | 6/1991 | Cochran et al. | 525/371 |
| 5,045,331 | 9/1991 | Antoon, Jr. | 426/118 |
| 5,049,624 | 9/1991 | Adams et al. | 525/371 |
| 5,064,698 | 11/1991 | Courtright et al. | 428/35.4 |
| 5,085,878 | 2/1992 | Hatakeyama et al. | 426/107 |
| 5,096,724 | 3/1992 | Zenner et al. | 426/124 |
| 5,101,611 | 4/1992 | Biskup et al. | 53/433 |
| 5,103,618 | 4/1992 | Garwood | 53/433 |
| 5,108,649 | 4/1992 | Matsumoto et al. | 252/188.28 |
| 5,110,677 | 5/1992 | Barmore et al. | 428/349 |
| 5,112,674 | 5/1992 | German et al. | 428/216 |
| 5,115,624 | 5/1992 | Garwood | 53/427 |
| 5,116,660 | 5/1992 | Komatsu et al. | 428/192 |
| 5,120,349 | 6/1992 | Stewart et al. | 71/93 |
| 5,120,585 | 6/1992 | Sutter et al. | 428/34.2 |
| 5,124,164 | 6/1992 | Matsumoto et al. | 426/398 |
| 5,128,060 | 7/1992 | Ueno et al. | 252/184 |
| 5,129,512 | 7/1992 | Garwood | 206/213 |
| 5,132,151 | 7/1992 | Graney | 428/40 |
| 5,135,787 | 8/1992 | Bair | 428/36.1 |
| 5,139,702 | 8/1992 | Carter et al. | 252/392 |
| 5,143,763 | 9/1992 | Yamada et al. | 428/36.2 |
| 5,143,769 | 9/1992 | Moriya et al. | 428/76 |
| 5,145,950 | 9/1992 | Funaki et al. | 528/481 |
| 5,151,331 | 9/1992 | Beeson et al. | 428/475.5 |
| 5,153,038 | 10/1992 | Koyama et al. | 428/35.8 |
| 5,155,974 | 10/1992 | Garwood | 53/510 |
| 5,158,537 | 10/1992 | Haak et al. | 604/20 |
| 5,171,593 | 12/1992 | Doyle | 426/106 |
| 5,176,849 | 1/1993 | Hwa et al. | 252/392 |
| 5,176,930 | 1/1993 | Kannankeril et al. | 426/124 |
| 5,183,573 | 2/1993 | Kreh et al. | 210/697 |
| 5,183,574 | 2/1993 | Hwa et al. | 210/701 |
| 5,183,848 | 2/1993 | Samuel et al. | 525/57 |
| 5,186,991 | 2/1993 | Samuel et al. | 428/35.8 |
| 5,194,315 | 3/1993 | Itoh | 428/178 |
| 5,202,052 | 4/1993 | Zenner et al. | 252/188.28 |
| 5,204,389 | 4/1993 | Hofeldt et al. | 524/72 |
| 5,207,943 | 5/1993 | Cullen et al. | 252/188.28 |
| 5,211,875 | 5/1993 | Speer et al. | 252/188.28 |
| 5,223,146 | 6/1993 | Kreh | 210/698 |
| 5,226,531 | 7/1993 | Garwood | 206/213 |
| 5,226,735 | 7/1993 | Beliveau | 383/103 |
| 5,227,411 | 7/1993 | Hofeldt et al. | 523/100 |
| 5,236,617 | 8/1993 | Ueno et al. | 252/188.28 |
| 5,239,016 | 8/1993 | Cochran et al. | 525/371 |
| 5,241,149 | 8/1993 | Watanabe et al. | 219/10.55 E |
| 5,242,111 | 9/1993 | Nakoneczny et al. | 239/47 |
| 5,244,600 | 9/1993 | Cuisia et al. | 252/396 |
| 5,247,746 | 9/1993 | Johnson et al. | 53/432 |
| 5,250,310 | 10/1993 | Fujino et al. | 426/124 |
| 5,254,354 | 10/1993 | Stewart | 426/106 |
| 5,258,537 | 11/1993 | Takeuchi et al. | 556/467 |
| 5,262,375 | 11/1993 | McKedy | 502/406 |
| 5,270,337 | 12/1993 | Graf | 514/499 |
| 5,284,871 | 2/1994 | Graf | 514/499 |
| 5,286,407 | 2/1994 | Inoue et al. | 252/188.28 |
| 5,288,907 | 2/1994 | Sherwin et al. | 564/301 |
| 5,290,268 | 3/1994 | Oliver et al. | 604/359 |
| 5,296,291 | 3/1994 | Mueller | 428/349 |
| 5,310,497 | 5/1994 | VeSpeer et al. | 252/188.28 |

| | | | |
|---|---|---|---|
| 5,320,598 | 6/1994 | Haak et al. | 604/20 |
| 5,322,701 | 6/1994 | Cullen et al. | 426/124 |
| 5,323,590 | 6/1994 | Garwood | 53/433 |
| 5,334,405 | 8/1994 | Gorlich | 426/396 |
| 5,346,312 | 9/1994 | Mabry et al. | 383/113 |
| 5,346,644 | 9/1994 | Speer et al. | 252/188.28 |
| 5,348,752 | 9/1994 | Gorlich | 426/124 |
| 5,350,622 | 9/1994 | Speer et al. | 428/215 |
| 5,362,531 | 11/1994 | Samuel et al. | 428/36.6 |
| 5,364,555 | 11/1994 | Zenner et al. | 252/188.28 |
| 5,364,669 | 11/1994 | Sumida et al. | 428/1 |
| 5,378,428 | 1/1995 | Inoue et al. | 422/9 |
| 5,390,475 | 2/1995 | Iwauchi et al. | 53/474 |
| 5,399,289 | 3/1995 | Speer et al. | 252/188.28 |
| 5,418,112 | 5/1995 | Mirle et al. | 430/269 |
| 5,422,366 | 6/1995 | Mintzis et al. | 514/474 |
| 5,425,896 | 6/1995 | Speer et al. | 252/188.28 |
| 5,430,098 | 7/1995 | Samuel et al. | 525/57 |
| 5,443,727 | 8/1995 | Gagnon | 210/490 |
| 5,491,019 | 2/1996 | Kuo | 428/213 |
| 5,492,705 | 2/1996 | Porchia et al. | 426/106 |
| 5,492,742 | 2/1996 | Zenner et al. | 428/35.2 |
| 5,498,364 | 3/1996 | Speer et al. | 252/188.28 |
| 5,510,166 | 4/1996 | Inoue et al. | 428/76 |
| 5,514,392 | 5/1996 | Garwood | 426/106 |
| 5,529,833 | 6/1996 | Speer et al. | 428/215 |
| 5,580,573 | 12/1996 | Kydonieus et al. | 424/449 |
| 5,585,129 | 12/1996 | Geddes et al. | 426/394 |
| 5,631,036 | 5/1997 | Davis | 426/396 |
| 5,638,660 | 6/1997 | Kuo | 53/449 |
| 5,639,815 | 6/1997 | Cochran et al. | 524/413 |
| 5,643,625 | 7/1997 | Perry et al. | 426/395 |
| 5,648,020 | 7/1997 | Speer et al. | 252/188.28 |
| 5,660,761 | 8/1997 | Katsumoto et al. | 252/188.28 |
| 5,665,822 | 9/1997 | Bitler et al. | 525/92 C |
| 5,667,827 | 9/1997 | Breen et al. | 53/432 |
| 5,667,863 | 9/1997 | Cullen et al. | 428/68 |
| 5,672,406 | 9/1997 | Challis et al. | 428/136 |
| 5,686,126 | 11/1997 | Noel et al. | 426/127 |
| 5,686,127 | 11/1997 | Stockley, III et al. | 426/129 |
| 5,698,250 | 12/1997 | DelDuca et al. | 426/124 |
| 5,700,554 | 12/1997 | Speer et al. | 428/220 |
| 5,711,978 | 1/1998 | Breen et al. | 426/129 |
| 5,744,056 | 4/1998 | Venkateshwaran et al. | 252/188.28 |
| 5,811,142 | 9/1998 | Delduca et al. | 426/424 |

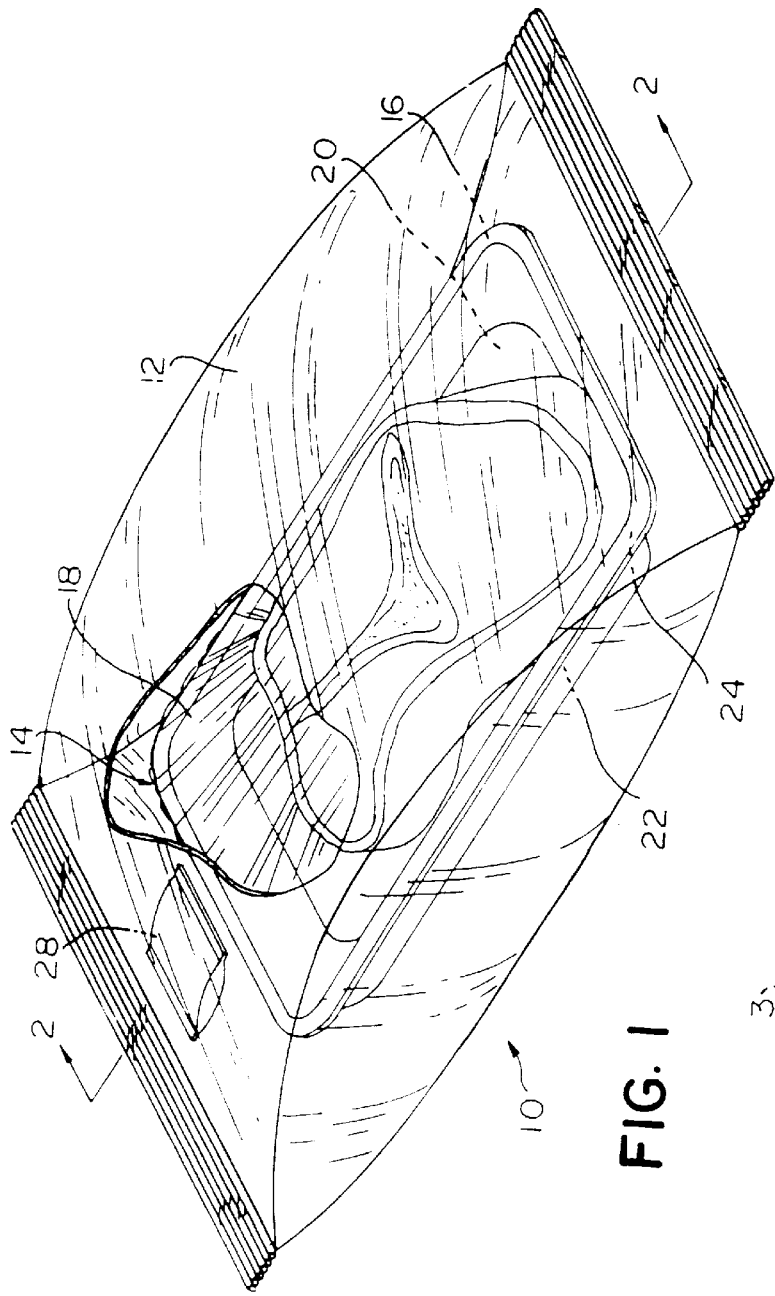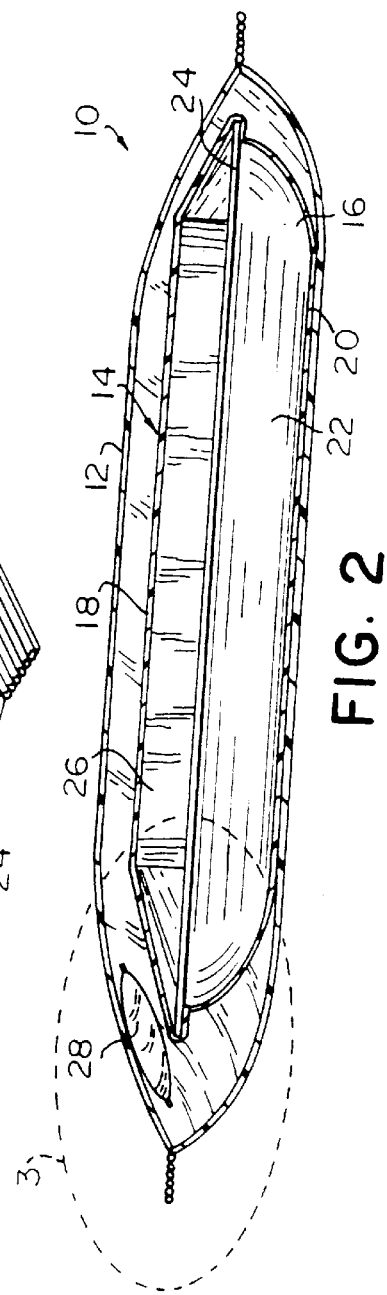

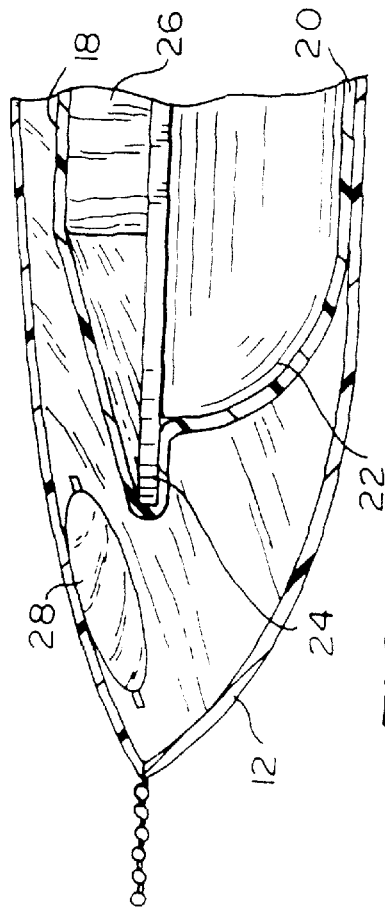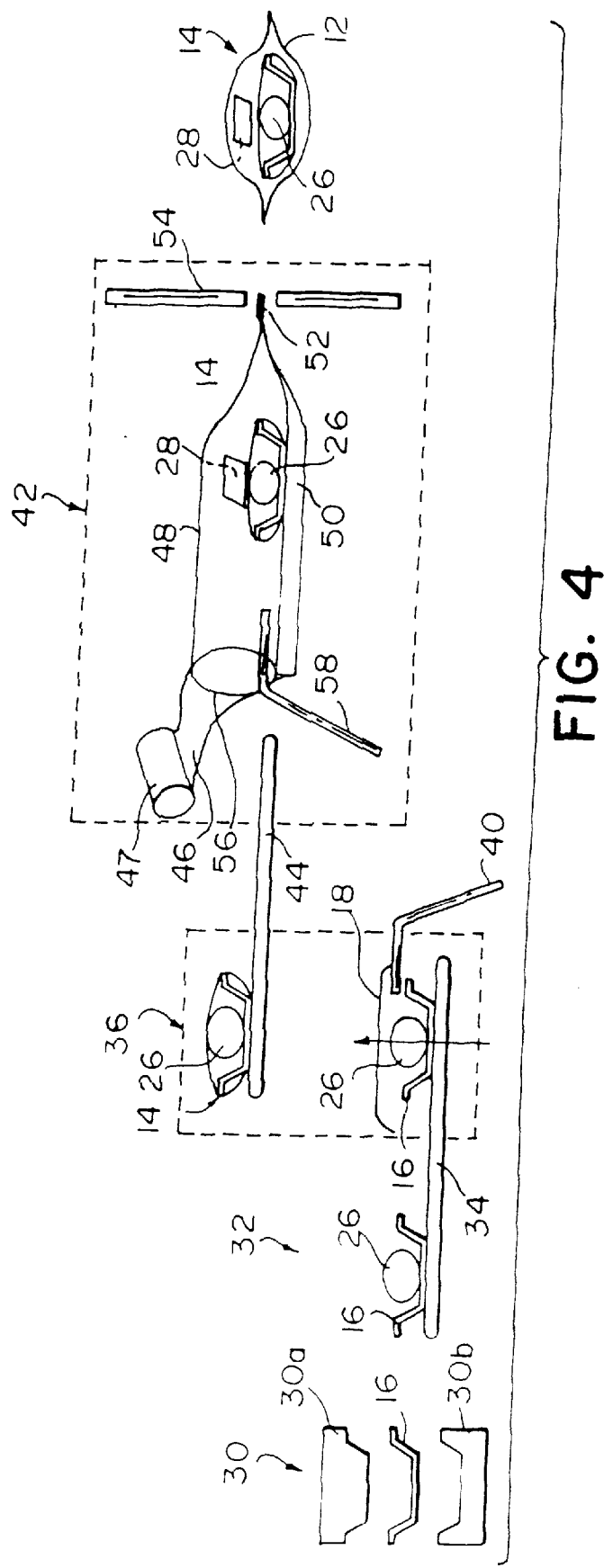
FIG. 3
FIG. 4

MODIFIED ATMOSPHERE PACKAGE

This is a continuation of application Ser. No. 08/763,719 filed Dec. 13, 1996, now U.S. Pat. No. 5,811,142, which is a continuation-in-part of U.S. patent application Ser. No. 08/627,137 filed Apr. 3, 1996 now U.S. Pat. No. 5,698,250.

FIELD OF THE INVENTION

The present invention relates generally to modified atmosphere packages for storing food. More particularly, the invention relates to a modified atmosphere package for extending the shelf life of raw meats or other food.

BACKGROUND OF THE INVENTION

Containers have long been employed to store and transfer perishable food prior to presenting the food at a market where it will be purchased by the consumer. After perishable foods, such as meats, fruits, and vegetables, are harvested, they are placed into containers to preserve those foods for as long as possible. Maximizing the time in which the food remains preserved in the containers increases the profitability of all entities in the chain of distribution by minimizing the amount of spoilage.

The environment around which the food is preserved is a critical factor in the preservation process. Not only is maintaining an adequate temperature important, but the molecular and chemical content of the gases surrounding the food is significant as well. By providing an appropriate gas content to the environment surrounding the food, the food can be better preserved when maintained at the proper temperature or even when it is exposed to variations in temperature. This gives the food producer some assurance that after the food leaves his or her control, the food will be in an acceptable condition when it reaches the consumer.

Modified atmosphere packaging systems for one type of food, raw meats, exposes these raw meats to either extremely high levels or extremely low levels of oxygen ($O_2$). Packaging systems which provide extremely low levels of oxygen are generally preferable because it is well known that the fresh quality of meat can be preserved longer under anaerobic conditions than under aerobic conditions. Maintaining low levels of oxygen minimizes the growth and multiplication of aerobic bacteria. Heretofore, low-level oxygen systems, such as the systems proposed in U.S. Pat. No. 3,574,642 to Weinke and U.S. Pat. No. 5,115,624 to Garwood, have obtained extremely low levels of oxygen by relying upon oxygen evacuation techniques.

In typical prior art packaging systems, a package composed of flexible or rigid gas barrier materials is loaded into an evacuation chamber. The package in the evacuation chamber is subjected to a vacuum which removes as much of the gases surrounding the package as possible. At this point the package is sealed. After the evacuated package is sealed, the raw meat either can be maintained in a "zero" atmosphere environment (commonly referred to as vacuum packaging) or can be refilled with a gas or mixture of gases to provide a modified atmosphere environment. To provide a modified atmosphere environment, the air-evacuated package is typically filled with a mixture of gases consisting of about 30 percent carbon dioxide ($CO_2$) and 70 percent nitrogen ($N_2$). Refilling the air-evacuated package with such a mixture of gases is believed to suppress the growth of anaerobic bacteria. The meat in the modified atmosphere package takes on a less desirable purple-red color which few consumers would associate with freshness. This purple-red color, however, quickly "blooms" to a bright red color generally associated with freshness when the package is opened to oxygenate the fresh meat by exposure to air. The package is typically opened immediately prior to display of the fresh meat to consumers so as to induce blooming of the fresh meat just prior to display to the consumers.

Low-level oxygen systems relying upon evacuation techniques to diminish oxygen levels suffer from several disadvantages. For example, such systems operate at exceptionally slow speeds because they require the use of an evacuation device along the packaging line. The evacuation process is time-consuming. Typically, only about four to six evacuated packages can be prepared on a packaging line in one minute. In addition, the evacuation techniques render it difficult to remove any oxygen within a previously wrapped package such as an overwrapped meat tray. The trapped oxygen raises the residual oxygen level in the package and can also cause billowing and subsequent damage to the package during evacuation.

A need therefore exists for a modified atmosphere package and a system for making that package which overcome the aforementioned shortcomings associated with existing modified atmosphere packages and existing systems for making those packages.

SUMMARY OF THE INVENTION

Briefly, the present invention is directed to a new and improved modified atmosphere package for extending the shelf life of food, especially raw meats. Moreover, the present invention is directed to a new and improved modified atmosphere packaging system for producing the foregoing packages which operates at significantly higher speeds than prior art systems and which reduces the oxygen level in the packages without the use of time-consuming evacuation techniques. The packaging system effectively extends the allowable time period between cutting and purchase of retail cuts of raw meat. The raw meat can be cut and packaged several weeks prior to being purchased at the store and yet remains fresh during this time period.

The modified atmosphere package maintains an appropriate contained atmosphere around food being contained therein when stored in an ambient environment. A modified atmosphere packaging system and method creates a modified atmosphere in the package. In one embodiment, the modified atmosphere package includes an inner package and an outer package. The inner package is composed at least partially of a polymeric material substantially permeable to oxygen, while the outer package is composed of a polymeric material substantially impermeable to oxygen. After a food product such as raw meat is placed within the inner package, the inner package may be flushed with a desired mixture of gases to substantially remove oxygen from the inner package. The flushed inner package is then wrapped and inserted into the outer package without sealing the outer package. Next, the outer package is flushed with the desired mixture of gases to substantially remove oxygen from the outer package. After flushing the outer package, the outer package is sealed. An oxygen scavenger is provided in the modified atmosphere package to substantially absorb any residual oxygen within the package. The oxygen scavenger is preferably activated with an oxygen uptake accelerator to increase the rate at which the residual oxygen is absorbed.

The above summary of the present invention is not intended to represent each embodiment, or every aspect of the present invention. This is the purpose of the Figures and detailed description which follow.

BRIEF DESCRIPTION OF THE DRAWINGS

Other objects and advantages of the invention will become apparent upon reading the following detailed description and upon reference to the drawings in which:

FIG. 1 is an isometric view of a modified atmosphere package embodying the present invention;

FIG. 2 is a section view taken generally along line 2—2 in FIG. 1;

FIG. 3 is an enlarged view taken generally along circled portion 3 in FIG. 2;

FIG. 4 is a diagrammatic side view of a system for making the modified atmosphere package in FIG. 1;

Figure 5:
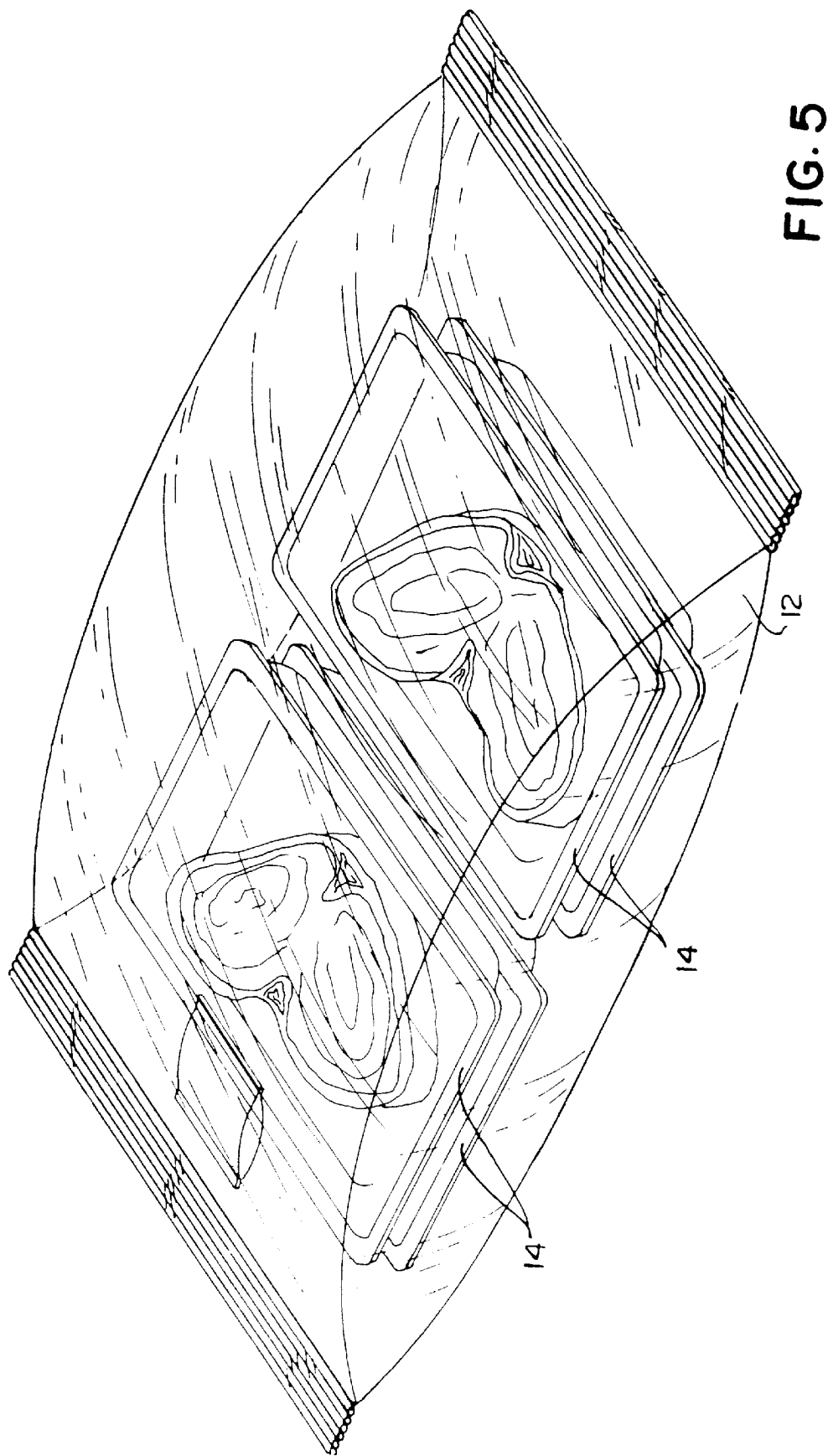
FIG. 5 is an elevational view of an alternative embodiment of a modified atmosphere package.

While the invention is susceptible to various modifications and alternative forms, certain specific embodiments thereof have been shown by way of example in the drawings and will be described in detail. It should be understood, however, that the intention is not to limit the invention to the particular forms described. On the contrary, the intention is to cover all modifications, equivalents, and alternatives falling within the spirit and scope of the invention as defined by the appended claims.

DESCRIPTION OF THE PREFERRED EMBODIMENT

Turning now to the drawings, FIGS. 1–3 depict a modified atmosphere package 10 including an outer package 12 and an inner package 14. The term "package" as used herein shall be defined as any means for holding raw meat, including a container, carton, casing, parcel, holder, tray, flat, bag, film envelope, etc. At least a portion of the inner package 14 is permeable to oxygen. The inner package 14 includes a conventional semi-rigid plastic tray 16 thermoformed from a sheet of polymeric material which is substantially permeable to oxygen. Exemplary polymers which may be used to form the non-barrier tray 16 include polystyrene foam, cellulose pulp, polyethylene, polypropylene, etc. In a preferred embodiment, the polymeric sheet used to form the tray 16 is substantially composed of polystyrene foam and has a thickness ranging from about 100 mils to about 300 mils. The use of a common polystyrene foam tray 16 is desirable because it has a high consumer acceptance. The inner package 14 further includes a stretch film wrapping or cover 18 substantially composed of a polymeric material, such as polyvinyl chloride (PVC), which is substantially permeable to oxygen. In a preferred embodiment, the stretch film used to form the cover 18 contains additives which allow the film to cling to itself, has a thickness ranging from about 0.5 mil to about 1.5 mils, and has a rate of oxygen permeability greater than about 1000 cubic centimeters per 100 square inches in 24 hours. Most preferably, the film has a rate of oxygen permeability grater than about 10,000 cubic centimeters per 100 square inches in 24 hours. To help attain this high rate of permeability, small holes may be punched into the film. One preferred stretch film is Resinite™ meat film commercially available from Borden Packaging and Industrial Products of North Andover, Mass.

The tray 16 is generally rectangular in configuration and includes a bottom wall 20, a continuous side wall 22, and a continuous rim or flange 24. The continuous side wall 22 encompasses the bottom wall 20 and extends upwardly and outwardly from the bottom wall 20. The continuous rim 24 encompasses an upper edge of the continuous side wall 22 and projects laterally outwardly therefrom. A food item such as a retail cut of raw meat 26 is located in a rectangular compartment defined by the bottom wall 20 and continuous side wall 22. The raw meat may be any animal protein, including beef, pork, veal, lamb, chicken, turkey, venison, fish, etc. Prior to fully wrapping the tray 16 with the cover 18, the partially formed inner package 14 may be flushed with an appropriate mixture of gases, typically a mixture of about 30 percent carbon dioxide and about 70 percent nitrogen, to lower the oxygen level in the inner package 14 to about 1.5 to 5.0 percent. The foregoing mixture of gases displaces the oxygen within the inner package 14 during the flushing operation. After flushing the inner package 14, the tray 16 is manually or automatically wrapped with the cover 18. The cover 18 is wrapped over the retail cut of raw meat 26 and about both the side wall 22 and bottom wall 20 of the tray 16. The free ends of the cover 18 are overlapped along the underside of the bottom wall 20 of the tray 16, and, due to the cling characteristic inherent in the cover 18, these overlapping free ends cling to one another to hold the cover 18 in place. If desired, the overwrapped tray 16, i.e., the inner package 14, may be run over a hot plate to thermally fuse the free ends of the cover 18 to one another and thereby prevent these free ends from potentially unraveling.

The outer package 12 is preferably a flexible polymeric bag composed of a single or multilayer plastics material which is substantially impermeable to oxygen. The polymeric bag 12 may, for example, include a multilayer coextruded film containing ethylene vinyl chloride (EVOH), or include an oriented polypropylene (OPP) core coated with an oxygen barrier coating such as polyvinylidene chloride and further laminated with a layer of sealant material such as polyethylene to facilitate heat sealing. In a preferred embodiment, the polymeric bag 12 is composed of a coextruded barrier film commercially available as product no. 325C44-EX861B from PrintPack, Inc. of Atlanta, Ga. The coextruded barrier film has a thickness ranging from about 2 mils to about 6 mils, and has a rate of oxygen permeability less than about 0.1 cubic centimeters per 100 square inches in 24 hours. Prior to sealing the peripheral edges of the polymeric bag 12, the inner package 14 is placed within the polymeric bag 12. Also, the bag 12 is flushed with an appropriate mixture of gases, typically about 30 percent carbon dioxide and about 70 percent nitrogen, to lower the oxygen level in the bag 12 to about 0.05 to 5.0 percent. After flushing the bag 12, but still prior to sealing the bag 12, an oxygen scavenger/absorber 28 is placed in the bag 12 external to the sealed inner package 14. The bag 12 is then sealed.

The oxygen scavenger 28 is designed to reduce the oxygen level in the bag 12 at a rate sufficient to prevent discoloration (e.g., browning) of the raw meat 26. Many factors influence the color stability of raw meat, but it has been found that the reduction of the oxygen level from the 0.05 to 5.0 percent level described about to less than about 0.05 percent within 90 minutes works for all types of raw meat. If there is still oxygen in the bag 12 after this time period, the oxygen scavenger 28 absorbs any remaining oxygen in the bag 12 and any oxygen which might still be trapped within the inner container 14 so as to lower the oxygen level in the bag 12 to about zero percent within 24 hours. The oxygen scavenger 28 also absorbs any oxygen which might permeate into the bag 12 from the ambient environment. To increase the rate of oxygen absorption, the oxygen scavenger is activated with an oxygen uptake accelerator in the form of a predetermined amount of activating agent or by other means just prior to being placed in the bag 12. The oxygen uptake accelerator is preferably selected from the group consisting of water or aqueous solutions of acetic acid, citric acid, sodium chloride, calcium chloride, magnesium chloride and copper.

Further information concerning the oxygen scavenger 28, the oxygen uptake accelerator, and the means for introducing the oxygen uptake accelerator to the oxygen scavenger 28 may be obtained from application Ser. No. 08/700,644, filed Aug. 8, 1996, and now abandoned, entitled "Oxygen Scavenger Accelerator," and incorporated herein by reference. In FIGS. 1–3, the oxygen scavenger 28 is illustrated as a packet or label which is inserted into the bag 12 prior to sealing the bag 12. Alternatively, an oxygen scavenging material may be added to the polymer or polymers used to form the outer package 12 so that the oxygen scavenging material is integrated into the outer package 12 itself.

The retail cut of raw meat 26 within the modified atmosphere package 10 takes on a purple-red color when the oxygen is removed from the interior of the package 10. The meat-filled modified atmosphere package 10 may now stored in a refrigeration unit for several weeks prior to being offered for sale at a grocery store. A short time (e.g., less than one hour) prior to being displayed at the grocery store, the inner package 14 is removed from the polymeric bag 12 to allow oxygen from the ambient environment to permeate the non-barrier tray 16 and non-barrier cover 18. The purple-red color of the raw meat 26 quickly changes or "blooms" to a generally acceptable bright red color when the raw meat 26 is oxygenated by exposure to air.

FIG. 4 illustrates a modified atmosphere packaging system used to produce the modified atmosphere package 10 in FIGS. 1–3. The packaging system integrates several disparate and commercially available technologies to provide a modified atmosphere for retail cuts of raw meat. The basic operations performed by the packaging system are described below in connection with FIG. 4.

The packaging process begins at a thermoforming station 30 where a tray 16 is thermoformed in conventional fashion from a sheet of polystyrene or other non-barrier polymer using conventional thermoforming equipment. The thermoforming equipment typically includes a male die member 30a and a female die cavity 30b. As is well known in the thermoforming art, the tray 16 is thermoformed by inserting the male die member 30a into the female die cavity 30b with the polymeric sheet disposed therebetween.

The thermoformed tray 16 proceeds to a goods loading station 32 where the tray 16 is filled with a food product such as a retail cut of raw meat 26. The meat-filled tray 16 is then manually carried or transported on a conveyor 34 to a conventional stretch wrapping station 36 where a stretch film 18 is wrapped about the tray 16 to enclose the retail cut of meat 26 therein. The overwrapped tray 16 forms the inner package 14. Just prior to sealing the meat-filled tray 16 at the stretch wrapping station 36, the tray 16 is flushed with a mixture of carbon dioxide and nitrogen to reduce the oxygen level in the tray 16 to about 1.5 to 5.0 percent. The mixture of carbon dioxide and nitrogen emanates from a conventional gas supply hollow tube or rod 40 fed by a gas tank (not shown). The stretch wrapping station 36 may be implemented with a compact stretch semi-automatic wrapper commercially available from Hobart Corporation of Troy, Ohio.

Next, the flushed and sealed inner package 14 proceeds to a high speed form, fill, and seal station 42 which may be implemented with a Fuji-Formost high-speed horizontal form-fill-seal machine commercially available as model no. FW-3700 from Formost Packaging Machines, Inc. of Woodinville, Wash. The inner package 14 may be transported to the form, fill, and seal station 42 by a conveyor 44. At the form, fill, and seal station 42, a web 46 of oxygen barrier film from a roll 47 is arranged to run along the direction of movement of the inner package 14. The web 46 of film is fed to a conventional forming box which forms a section 48 of the web 46 into a tube configuration encompassing the inner package 14. The tube-shaped section 48 of the web 46 is thermally sealed along a lower fin 50 and is thermally sealed at one end 52 by a pair of vertically-oscillating heated sealing bars 54 or the like.

Just prior to sealing the other end 56 of the tube-shaped web section 48 to complete formation of the polymeric bag 12, the web section 48 is flushed with an appropriate mixture of gases, typically about 30 percent carbon dioxide and about 70 percent nitrogen, to lower the oxygen level in the bag 12 to about 0.05 to 5.0 percent. The mixture of carbon dioxide and nitrogen emanates from a conventional gas supply hollow tube or rod 58 fed by a gas tank (not shown). After flushing the web section 48, but still prior to sealing the end 56, the oxygen scavenger/absorber 28 is placed in the web section 48 external to the sealed inner container 14 and the oxygen scavenger 28 is activated with an oxygen uptake accelerator. The end 56 is then conveyed between and sealed by the heated sealing bars 54 to complete formation of the bag 12. In addition to thermally fusing the web section 48 at the end 56, the heated sealing bars 54 sever the web section 48 at the end 56 to separate the bag 12 from the next upstream web section being formed into another bag. The sealed bag 12 is substantially in the form of a sealed bubble or envelope loosely containing the inner package 14 and providing a sealed modified atmosphere surrounding the inner package 14.

The oxygen scavenger 28 lowers the oxygen level in the package 10 from the previously described 0.05 to 5.0 percent oxygen level to less than about 0.05 percent within a time period of about 90 minutes. Although the oxygen scavenger 28 is depicted in FIG. 4 as a packet or label inserted into the polymeric bag 12, an oxygen scavenger may alternatively be integrated into the polymers used to form the bag 12. One preferred oxygen scavenger is a FreshPax™ oxygen absorbing packet commercially available from MultiSorb Technologies, Inc. (formerly Multiform Desiccants Inc.) of Buffalo, N.Y.

The modified atmosphere packaging system in FIG. 4 can produce the modified atmosphere packages 10 at cycle rates ranging from about 1 to 60 packages per minute. The maximum cycle rates which can be attained by the system in FIG. 4 are significantly higher than the cycle rates which can be achieved by prior art systems. The attainment of high cycle rates is largely due to the fact that the packaging system in FIG. 4 relies upon the use of simple, commercially available, and high-speed form, fill, and seal equipment, as opposed to the slower evacuation equipment employed by prior art systems. Reducing oxygen levels in the modified atmosphere package 10 by first flushing the package 10 and then subsequently introducing the activated oxygen scavenger 28 into the package 10 is significantly faster and more cost-effective than the reliance upon slow evacuation techniques.

While the present invention has been described with reference to one or more particular embodiments, those skilled in the art will recognize that many changes may be made thereto without departing from the spirit and scope of the present invention. For example, as shown in FIG. 5, multiple inner packages 14 may be placed into a single outer package 12. Each of these embodiments and obvious variations thereof is contemplated as falling within the spirit and scope of the claimed invention, which is set forth in the following claims.

What is claimed is:

1. A modified atmosphere package comprising first and second compartments separated by a partition member, said partition member including a non-barrier portion substantially permeable to oxygen, said first and second compartments being encompassed by an outer wall substantially impermeable to oxygen, said first compartment being substantially free of oxygen in response to substantially removing the oxygen from said pocket and introducing one or more gases creating a modified atmosphere within said first compartment, said first compartment containing an oxygen scavenger activated with an oxygen scavenger accelerator to substantially absorb residual oxygen within said first compartment, said second compartment containing a retail cut of raw meat.

2. The package of claim 1, wherein said partition member includes a tray covered by a stretch film wrapping, said tray and said stretch film wrapping enclosing said second compartment.

3. The package of claim 1, wherein said non-barrier portion of said partition member has a rate of oxygen permeability greater than about 1000 cubic centimeters per 100 square inches in 24 hours.

4. The package of claim 3, wherein said outer wall has a rate of oxygen permeability less than about 0.1 cubic centimeters per 100 square inches in 24 hours.

5. The package of claim 1, wherein said oxygen scavenger is constructed to reduce a level of said residual oxygen to less than about 0.05 percent within 90 minutes after flushing said first compartment.

6. The package of claim 1, wherein said oxygen scavenger includes an oxygen-absorbing packet disposed within said first compartment.

7. The package of claim 1, wherein said oxygen scavenger includes an oxygen-absorbing material integrated into the material used to form said partition member.

8. The package of claim 1, wherein said outer wall includes a plastic bag.

9. The package of claim 1, wherein said retail cut of raw meat is substantially totally enclosed within said second compartment.

10. A method of manufacturing a modified atmosphere package having first and second compartments separated by a partition member, said partition member including a non-barrier portion substantially permeable to oxygen, said first and second compartments being encompassed by an outer wall substantially impermeable to oxygen, said method comprising the steps of:

placing a retail cut of raw meat within said second compartment;

sealing said second compartment;

substantially removing oxygen from said first compartment and introducing one or more gases;

supplying said first compartment with an oxygen scavenger to absorb residual oxygen within said first compartment;

activating said oxygen scavenger with an oxygen scavenger accelerator; and sealing said outer wall.

11. The method of claim 10, wherein said partition member includes a tray covered by a stretch film wrapping, said tray and said stretch film wrapping enclosing said second compartment.

12. The method of claim 11, wherein said outer wall includes a plastic bag.

13. The method of claim 10, wherein said non-barrier portion of said partition member has a rate of oxygen permeability greater than about 1000 cubic centimeters per 100 square inches in 24 hours.

14. The method of claim 13, wherein said outer wall has a rate of oxygen permeability less than about 0.1 cubic centimeters per 100 square inches in 24 hours.

15. The method of claim 10, wherein said oxygen scavenger is constructed to reduce a level of said residual oxygen to less than about 0.05 percent within 90 minutes after flushing said first compartment.

16. A modified atmosphere package, comprising:

a first package configured and sized to substantially totally enclose a retail cut of raw meat and including a non-barrier portion substantially permeable to oxygen;

a second package covering said first package and being substantially impermeable to oxygen, said second package creating a pocket between said first package and said second package, said pocket being substantially free of oxygen in response to substantially removing the oxygen from said pocket and introducing one or more gases creating a modified atmosphere within said pocket; and an oxygen scavenger positioned external to said first package to substantially absorb residual oxygen within said pocket, said oxygen scavenger being activated with an oxygen uptake accelerator.

17. A method of manufacturing a modified atmosphere package, said method comprising the steps of:

supplying a first package including a non-barrier portion substantially permeable to oxygen;

placing a retail cut of raw meat within said first package;

sealing said first package;

supplying a second package substantially impermeable to oxygen;

covering said first package with said second package without sealing said second package so as to create a pocket between said first package and said second package;

substantially removing oxygen from said pocket and introducing one or more gases into said pocket to create a modified atmosphere therein;

supplying an oxygen scavenger positioned external to said first package to absorb residual oxygen within said pocket;

activating said oxygen scavenger with an oxygen scavenger accelerator; and sealing said second package.

* * * * *

EX PARTE REEXAMINATION CERTIFICATE (10577th)

United States Patent
DelDuca et al.

(10) Number: US 5,948,457 C1
(45) Certificate Issued: *Apr. 27, 2015

(54) MODIFIED ATMOSPHERE PACKAGE

(75) Inventors: Gary R. DelDuca, Canandaigua, NY (US); Alan E. Deyo, Rushville, NY (US); Vinod K. Luthra, Pittsford, NY (US); Wen P. Wu, Pittsford, NY (US)

(73) Assignee: PACTIV CORPORATION, Lake Forest, IL (US)

Reexamination Request:
No. 90/011,131, Sep. 7, 2010

Reexamination Certificate for:
Patent No.: 5,948,457
Issued: Sep. 7, 1999
Appl. No.: 09/094,008
Filed: Jun. 9, 1998

(*) Notice: This patent is subject to a terminal disclaimer.

Related U.S. Application Data

(63) Continuation of application No. 08/763,719, filed on Dec. 13, 1996, now Pat. No. 5,811,142, which is a continuation-in-part of application No. 08/627,137, filed on Apr. 3, 1996, now Pat. No. 5,698,250.

(51) Int. Cl.
*A23B 4/16* (2006.01)
*A23L 3/3418* (2006.01)
*A23L 3/3436* (2006.01)
*B65D 77/00* (2006.01)
*B65D 81/26* (2006.01)

(52) U.S. Cl.
CPC .............. *A23B 4/16* (2013.01); *A23L 3/3418* (2013.01); *A23L 3/3436* (2013.01); *B65D 77/003* (2013.01); *B65D 81/26* (2013.01); *B65D 81/268* (2013.01)

(58) Field of Classification Search
None
See application file for complete search history.

(56) References Cited

To view the complete listing of prior art documents cited during the proceeding for Reexamination Control Number 90/011,131, please refer to the USPTO's public Patent Application Information Retrieval (PAIR) system under the Display References tab.

*Primary Examiner* — Krisanne Jastrzab

(57) ABSTRACT

A modified atmosphere packaging method creates a modified atmosphere in a package including an inner package and an outer package. The inner package is composed at least partially of a polymeric material substantially permeable to oxygen, while the outer package is composed of a polymeric material substantially impermeable to oxygen. After a food product such as raw meat is placed within the inner package, the inner package is flushed with a desired mixture of gases to substantially remove oxygen from the inner package. The flushed inner package is then sealed and inserted into the outer package without sealing the outer package. Next, the outer package is flushed with the desired mixture of gases to substantially remove oxygen from the outer package. After flushing the outer package, the outer package is sealed. An oxygen scavenger is provided in the package to substantially absorb any residual oxygen within the package. The oxygen scavenger is activated with an oxygen uptake accelerator to increase the rate at which the residual oxygen is absorbed.

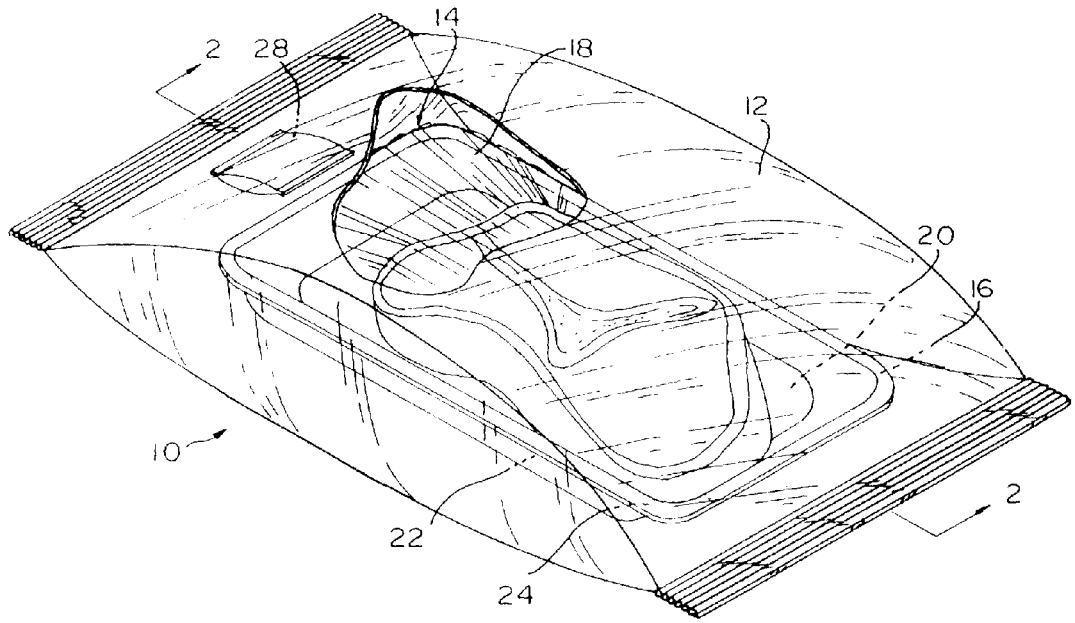

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-17 are cancelled.

* * * * *